(12) United States Patent
Caris et al.

(10) Patent No.: US 7,562,128 B1
(45) Date of Patent: Jul. 14, 2009

(54) STB CONNECTS REMOTE TO WEB SITE FOR CUSTOMIZED CODE DOWNLOADS

(75) Inventors: Franciscus Cornelis Caris, San Jose, CA (US); Frederik Ekkel, Cupertino, CA (US); Thomas James Dubil, Morgan Hill, CA (US)

(73) Assignee: Philips Koninklijke Philips Electronics N.V., Eindhoven (NL)

( * ) Notice: Subject to any disclaimer, the term of this patent is extended or adjusted under 35 U.S.C. 154(b) by 903 days.

(21) Appl. No.: 09/653,784

(22) Filed: Sep. 1, 2000

Related U.S. Application Data

(63) Continuation-in-part of application No. 09/519,546, filed on Mar. 6, 2000, now abandoned.

(51) Int. Cl.
*G06F 15/177* (2006.01)
*G06F 12/00* (2006.01)

(52) U.S. Cl. ........................ 709/220; 709/221

(58) Field of Classification Search ................. 709/220, 709/221, 203, 217–218, 226–229, 250; 700/1; 706/95; 455/304; 348/164, 172, 14.05, 734; 340/825; 345/720, 40, 11; 379/74; 398/106; 369/24–25
See application file for complete search history.

(56) References Cited

U.S. PATENT DOCUMENTS

| | | | | |
|---|---|---|---|---|
| 4,450,520 A | * | 5/1984 | Hollaar et al. ................ 710/65 |
| 5,228,077 A | * | 7/1993 | Darbee .................. 379/102.01 |
| 5,410,326 A | * | 4/1995 | Goldstein ................... 348/734 |
| 5,414,756 A | * | 5/1995 | Levine ......................... 379/67 |
| 5,544,161 A | * | 8/1996 | Bigham et al. .............. 370/397 |
| 5,583,864 A | * | 12/1996 | Lightfoot et al. ............ 370/396 |
| 5,583,920 A | * | 12/1996 | Wheeler, Jr. ............. 379/88.01 |
| 5,608,447 A | * | 3/1997 | Farry et al. ................. 725/116 |
| 5,629,868 A | | 5/1997 | Tessier et al. |
| 5,671,404 A | * | 9/1997 | Lizee et al. .................... 707/5 |
| 5,761,606 A | * | 6/1998 | Wolzien ..................... 725/110 |
| 5,790,753 A | * | 8/1998 | Krishnamoorthy et al. .... 79/203 |
| 5,794,210 A | * | 8/1998 | Goldhaber et al. ............ 705/14 |

(Continued)

FOREIGN PATENT DOCUMENTS

EP 0862304 A2 9/1998

(Continued)

OTHER PUBLICATIONS

NetSupport Manager 5 offers affordable remote control, Hammond, Eric., InfoWorld v21n46, p. 52, 64, Nov. 15, 1999, ISSN 0199-6649.*

(Continued)

*Primary Examiner*—Zarni Maung

(57) ABSTRACT

A set top box (STB) is marketed together with a programmable remote. The remote has a dedicated button to connect the STB to a specific server on the Internet. The consumer can notify the server of his/her other CE equipment, which he/she desires to be controllable through the same remote as the one that came with the STB. The server downloads to the STB data representative of the relevant control codes. The STB is provided with means to program the remote with these codes. In return the server has obtained detailed and accurate information about this consumer's equipment. A reliable customer base can thus be built for streamlining Help Desk operations.

20 Claims, 2 Drawing Sheets

U.S. PATENT DOCUMENTS

| | | | |
|---|---|---|---|
| 5,819,294 A | | 10/1998 | Chambers |
| 5,915,026 A | | 6/1999 | Mankovitz |
| 5,933,811 A | * | 8/1999 | Angles et al. ................. 705/14 |
| 6,008,735 A | * | 12/1999 | Chiloyan et al. ....... 340/825.22 |
| 6,075,527 A | * | 6/2000 | Ichihashi et al. ............ 715/721 |
| 6,104,334 A | * | 8/2000 | Allport ....................... 341/175 |
| 6,249,809 B1 | * | 6/2001 | Bro ............................ 709/217 |
| 6,314,572 B1 | * | 11/2001 | LaRocca et al. .............. 725/60 |
| 6,477,573 B1 | * | 11/2002 | Lea ............................ 709/224 |
| 6,490,726 B2 | * | 12/2002 | Harrison et al. ............ 725/110 |
| 6,493,688 B1 | * | 12/2002 | Bakker et al. ................. 706/20 |
| 6,563,430 B1 | * | 5/2003 | Kemink et al. ......... 340/825.49 |
| 6,578,142 B1 | * | 6/2003 | Anderson et al. .............. 713/2 |
| 2002/0080154 A1 | * | 6/2002 | Matthews et al. ........... 345/700 |

FOREIGN PATENT DOCUMENTS

| | | |
|---|---|---|
| WO | 9950807 | 10/1999 |
| WO | 0017738 A1 | 3/2000 |
| WO | 0017789 A1 | 3/2000 |
| WO | 0028436 A1 | 5/2000 |
| WO | 0039772 | 7/2000 |

OTHER PUBLICATIONS

Take Control, Freed, Les PC Magazine, Mar. 9, 2000, p. 64, ISSN 0888-8507.*

A universal information appliance, Eustice, K.F., et al., IBM Journal, vol. 38, No. 4, 199, ISBN 0018-8670/99, p. 575-601.*

A Middleware Component Supporting Flexible User Interaction for Networked Home Appliances, Nakajima, T., pp. 68-74.*

Consumer Electronics, Technology 1997, Analysis & Forecast, IEEE Spectrum, Jan. 1997, ISBN 0018-9235/97, p. 43-48.*

On Newstands Now, Issue 2.08, Aug. 1994, Fetish, Jacobs, D., p. 1.*

Product Review-The Lexison 500T System Controller, Long, D., Apr. 1996, p. 1-3.*

A Set-top for Internet Browsing: The UTVSurfer system, Loiue, Wai Ming, vol. 38/01 of Masters Abstracts, ISBN 0-612-40941-4, 1998, p. 1-99.*

Design and Implementation of Internet-TV, Tomari, Y., et al., IEEE ISBN 0098-3063/97, 1997, p.. 953-960.*

* cited by examiner

STB CONNECTS REMOTE TO WEB SITE FOR CUSTOMIZED CODE DOWNLOADS

This application is a continuation-in-part of U.S. patent application No. 09/519,546, filed Mar. 6, 2000 now abandoned.

FIELD OF THE INVENTION

The invention relates to a business model and network architecture supporting the interests of network operators, manufacturers of IP-connected electronic equipment and end-users of the equipment.

BACKGROUND ART

Philips Electronics provides the SmartConnect (SM) service to end-users of CE equipment, especially equipment that is Internet-connected. An implementation of the SmartConnect (SM) service uses a special button on a remote control device that enables the user to directly connect, e.g., via a set top box (STB), to a dedicated SmartConnect (SM) web site. The site provides Philips Electronics with direct contact to the individual end-user, enables warranty registration, alerts the user to additional accessory sales, and provides specific content, advice, services, etc., all supported by the individual user's profile.

Aspects of the SmartConnect (SM) service are discussed in published International Application WO0017789, corresponding to U.S. Ser. No. 09/160,490, herein incorporated by reference, and in published International Application WO0028436, corresponding to U.S. Ser. No. 09/189,535, herein incorporated by reference.

The SmartConnect (SM) service enables, e.g., customizing a technical functionality of network—(e.g., Internet-) enabled equipment of an end-user and supplying customized content information. A profile of the end-user and information about a technical feature for use with the equipment are stored at a server system. Based on the user-profile it is determined whether or not the user should be notified about the availability of this feature. If it has been decided that there is a match between the user profile as stored and the information about this feature, the end-user gets notified via the network of the option to obtain the feature for being added to his/her equipment. In case the feature relates to new software, it can be downloaded via the network for preferably automatic installation in the equipment. In case the feature comprises a hardware component, it can be shipped to the end-user upon acceptance of the offer. A helpdesk is preferably provided through the network to help the end-user install the feature.

SmartConnect (SM) is based on the insight that network-enabled equipment is becoming a flexible repository into which the end-user can place new and exciting features over time, dependent on the user's needs or desires, context of use, advancement of technology, etc. Not all end-users are always interested in all possible features for creating enhanced functionality of the equipment. Accordingly, a user-profile is established, either when the user registers his equipment with the notification service, or dynamically as a consequence of the user's interaction with the server system, or through a combination thereof. The profile is used to select technical features that are likely of interest to the user. In this manner, the user is kept abreast of the latest trends of interest to him/her. This approach implicitly supports virtual recycling as equipment needs to be designed for the purpose of being upgraded. The modular approach of adding or deleting technical software or hardware features as needed thus assists in slowing down the trend that products become obsolete fairly quickly, but without barring the manufacturer or aftermarket sales organizations from continuing doing business.

SUMMARY OF THE INVENTION

The inventors believe that the above SmartConnect (SM) concept can be made an attractive feature to Network Operators, especially where STB's are concerned, since the Network Operators assume full control and responsibility of the equipment with respect to the end-users. To this end, the inventors propose to market a programmable, remote control device together with IP-connected consumer electronics (CE) equipment, e.g., a set-top box. This remote has a SmartConnect (SM) button for connection via the set-top box to the SmartConnect (SM) service site on the Web. The SmartConnect (SM) server has a database of control codes for most of the commercially available equipment that can be controlled via a remote. The server can also contain information regarding the remote's user-interface (UI's) to the equipment, e.g., button names, graphical user interface panels for a touch screen remote, and other features that support user-interaction with the remote. The user provides to the server information about further equipment he/she has available and would like to be controllable through a single remote. The database is queried based on the user's input. When the proper code sets and accompanying UI data have been found, the codes and UI data are downloaded to the user's STB. Preferably, the server or STB enables the user to configure the code and data, e.g., for causing a single action at the remote to execute multiple activities of the user's appliances. This configuration can be formed prior to the transfer of the code and UI data to the remote. The STB enables programming its remote with the downloaded codes and/or UI data, e.g., through an IR or RF transmitter/blaster or a serial cable connecting the STB to a serial port of the remote for unidirectional communication with the STB, or through any other suitable means and procedures.

As an alternative to a dedicate hard button on the remote, the user can also access the server via selection in a menu displayed on a display monitor, e.g., the display monitor of TV set or another apparatus driven by the STB, or the LCD touch screen of a universal programmable remote such as the PRONTO™ of Philips Electronics.

As to the server containing data regarding the remote's UI, this relates to, e.g., the specific location of each of the remote's hard buttons or softkeys, or their names, so as to be able to associate a specific code with a button. When the remote has an LCD touch screen, such as the PRONTO™ of Philips Electronics, the UI data can also relate to, e.g., one or more panels of softkeys, and/or to the desired distribution of the softkeys among the panels. Preferably, the softkeys are clustered in a semantically logical manner so as to enhance user-friendliness of the remote in operational use.

Preferably, the consumer is allowed to affect or manipulate the data prior to the data being programmed into the remote control device. This can be achieved, e.g., through a menu displayed via the STB, wherein the consumer is requested to specify whether or not he/she desires certain operations with respect to the data. The menu can be displayed on, e.g., the TV's monitor or a display of a touch screen based handheld. The server is capable of making suggestions regarding these operations because of this consumer's profile. For example, the menu offers the option to program a single action on the remote to cause the execution of multiple activities of specific appliances among the CE equipment. This operation are preferably performed prior to programming the code and UI data into the remote control, either at the server or at the STB if the latter has the proper software application.

In this configuration stage, the server may display via the STB a graphical representation of the remote to be programmed and highlight one or more specific ones of the remote keys to illustrate to the consumer what is happening.

The invention also relates to a method of creating a customer base. The method comprises enabling a user of CE equipment to specify to a server on a data network information about the equipment. The method further comprises enabling to program a remote via the data network according to the information, and storing the information in the customer base. The remote can be a pre-programmed one for use with a set top box, the method being used for subsidizing the STB. The remote can be the one supplied with the STB. The method can also comprise enabling to use the customer base to provide a customized service to the user. The invention also relates to a method of providing a customized service to a user of CE equipment using a user profile based on the user having specified to a server on a data network information about the equipment for enabling to program a remote via the data network The invention is based on the following insight. When the end-user installs the STB at home and switches it on, it works directly out of the box and with the remote that came with it. Typically, the remote supplied with the set-top box is user-programmable. In order to use this remote for all other CE equipment in the home this dedicated remote needs to be programmed. Conventionally, in order to program a remote, the user has to look into the remote's manual (in the case of a TiVo box those pages are in the on-screen Setup Menu), has to scan the list of controllable equipment for which the remote is suitable and has to find the proper brand, type, and version. Then, the user has to read, for example, the numerical codes associated with the relevant equipment and enter them into the remote. A scenario wherein the user has to collect the information and then manually enter it into the remote is believed to be a user-unfriendly way of configuring the remote. Studies indicate that most users will not go through an extensive programming exercise and, therefore, will keep on using different remotes for different pieces of equipment. Much can go wrong in this manual configuration process for the remote, and the studies show that a significant percentage of all calls made to the manufacturer's Help Desk and, in case of STB's, the calls made to the Network Operator's Help Desk, are related to this programming issue. As a result significant costs are involved for the manufacturer and the Network Operator to provide customer support. The invention, now, makes the programmable remote of the set-top box an attractive feature to both the consumer and the Network Operators. In the invention, the user presses a dedicated button, in this example the SmartConnect (SM) button, on the remote and is thereupon presented with a dedicated web-site, here the SmartConnect (SM) web-site, through the IP-connected equipment, here the STB. After a sign-in process and an introduction to SmartConnect (SM) services, the user is requested to answer questions about the equipment he/she has available in the home and that he/she wants to become controllable through the remote. This could be combined with an on-line Warranty registration process. The information about the equipment and the user is communicated to the Smart-Connect (SM) server. Next, the SmartConnect (SM) server's database is scanned for the proper codes and/or relevant UI data. After the proper codes and UI data have been found, and after the user has added his/her customization as mentioned above, the user is prompted to place the remote within range of an IR or RF blaster, connected to or integrated within the STB, whereupon, via the web-site, the data for the proper codes and UI features is downloaded and programmed into the remote. Upon completion of this process, the SmartConnect (SM) remote is the most convenient one to be used. As the programming is an automated process from the consumer's point of view, the Network Operator's Call Center will not have to intervene in the programming or customizing phase of the remote.

The above scenario according to the invention provides an incentive to the user to submit accurate and detailed information to the SmartConnect (SM) server about the equipment for which the remote is to be programmed. If the user does not specify the equipment correctly, either the proper codes and/or UI data do not exist in the database or the ones downloaded do not match the intended equipment. Therefore, there is an incentive for the consumer to provide accurate information. This information, now, enables to create a truthful profile of the user, based on which the SmartConnect (SM) portal and its related services can be customized for this particular user.

The profile thus created is valuable to the service provider and network operators, as it enables to customize support based on an accurate inventory of the equipment on the consumer's home network. For example, the consumer may need support in order to correctly connect the proper video input/outputs on the STB to a TV monitor or HDD-based video recorder. As the Help Desk has available this customer's profile, a much more precise and less time-consuming walk through can be provided via the telephone. The invention represents a tool for implementing a substantial reduction in overhead at the Call Center or Help Desk.

The user profile obtained through the procedure of programming or updating the STB's remote can be made available to other parties, e.g., for targeted e-commerce, for example based on demographics, or for customized content.

The user-profile information is also relevant to the control code and UI feature database of the SmartConnect (SM) server as it reflects which codes are useful and are requested most frequently. This again can be used by manufacturers and other suppliers of remote control devices in order to bundle the codes and UI aspects in most-frequently used clusters is a pre-programmed remote.

Preferably, the STB or other IP-connected equipment is equipped with an IR or RF transmitter in the front bezel and with a range long enough to reach a user on the couch (typically 10 feet from the display screen) to minimize the user's efforts required.

The invention enables the SmartConnect (SM) server to collect valuable information about the user and his/her CE equipment, as already disclosed in published patent applications WO0017789 and WO0028436, mentioned above. This information can be provided to, e.g., the Network Operators in order for them to handle calls from end-users to the Call Center much more effectively, if still necessary, as the operator exactly knows what equipment the user has available.

In the above scenario, the programming feature is based on the SmartConnect (SM) button on the remote that comes with the set-top box. When the user has programmed the remote as described the SmartConnect (SM) button will stay active and pressing it will connect the user again with the SmartConnect (SM) portal. The remote may be provided with additional dedicated buttons for direct connection to other services, which in turn allows a business model for selling real estate on the remote in a subsidized model that reduces the initial costs for the end-user.

BRIEF DESCRIPTION OF THE DRAWING

The invention is explained in further detail, by way of example and with reference to the accompanying drawing, wherein.

Throughout the drawing, same reference numerals indicate similar or corresponding functionalities.

DETAILED EMBODIMENTS

As an example, consider the following scenario. A STB is marketed together with a programmable remote. The remote has a dedicated button to connect the STB to a specific server on the Internet. The user can notify the server of his/her other CE equipment, which he/she desires to be controllable by the same remote as the one that came with the STB. The server downloads to the STB data representative of the relevant control code and/or UI aspects. The STB is provided with means to program the remote with this code and UI.

Figure 1:
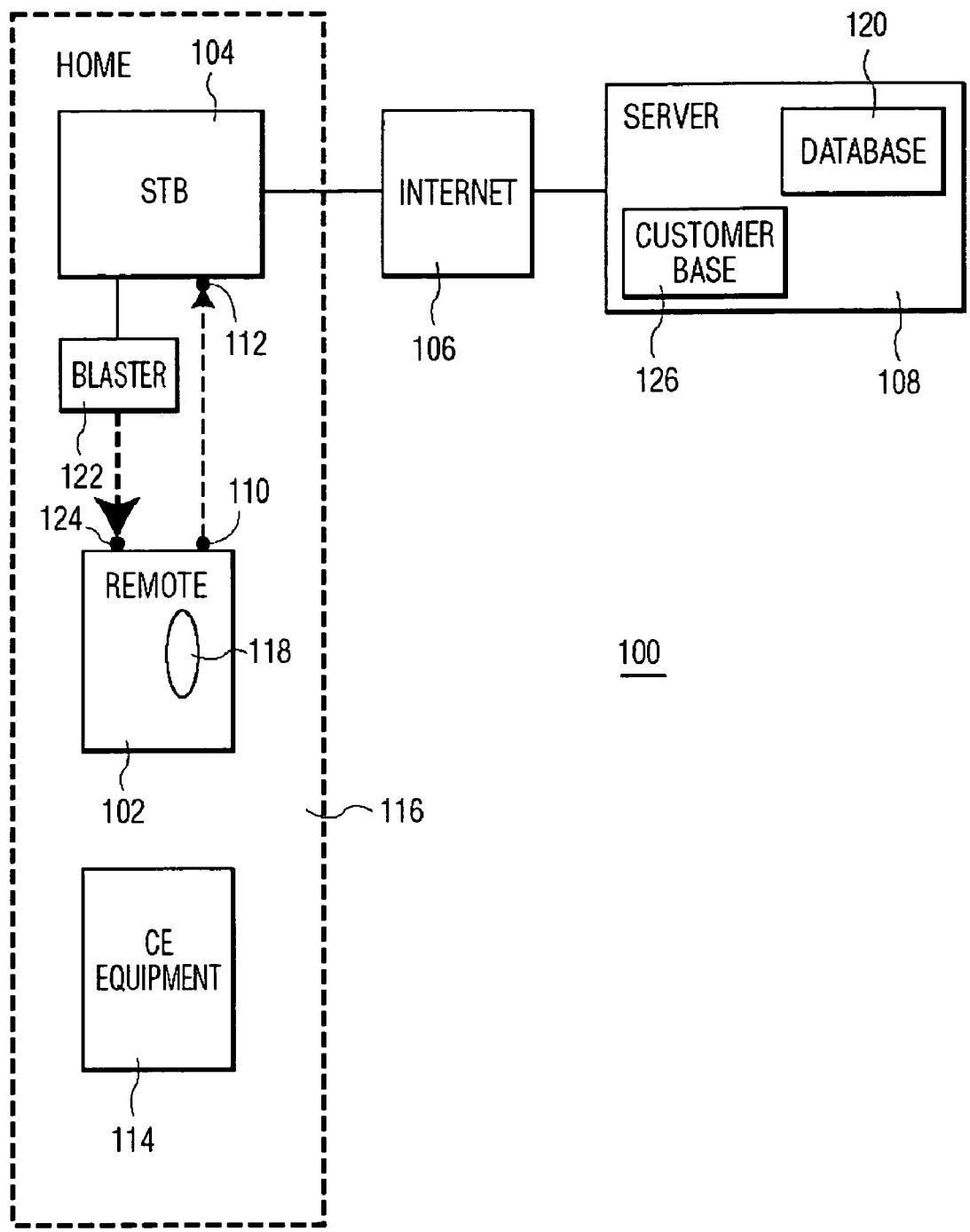
FIGS. 1 and 2 are block diagrams of systems in the invention.

FIG. 1 is a block diagram of a system 100 in the invention. System 100 comprises a remote control device 102, and an appliance 104 that is connected to the Internet 106. Device 102 comprises a traditional remote control device with hard buttons or a touch screen, LCD-based remote control device. System 100 further has a server 108. Appliance 104 in this example comprises a STB, that got purchased by the consumer in combination with remote 102 for operating STB 104 via, e.g., IR (infrared) transmitter 110 and receiver 112. Remote 102 is programmable in order to adopt control codes for other IR- or RF-controllable equipment, e.g., appliance 114, that the consumer has installed or will install in his/her home 116.

As mentioned above, the invention relates to a method of enabling a consumer to program remote control device 102, which is associated with appliance 104 that is Internet-connectable. The method comprises enabling connecting appliance 104, here an STB, to server 108 on the Internet 106 in response to the consumer controlling remote control device 102. Preferably, remote 102 has a dedicated button 118 for allowing the consumer to connect STB 104 via the Internet 106 to a specific server 108. The IR or RF code transmitted by remote 102 upon the consumer activating button 118 is interpreted by STB 104 as a request to send a message to server 108. Server 108 presents a web site on a TV display monitor (not shown) connected to STB 104 that guides the consumer to providing certain information. The consumer interacts via STB 104 with server 108 through a user-input means (not shown), e.g., a wireless keyboard, a remote control or another user-input means to supply to server 108 alphanumeric information, e.g., brand, type, serial number, about his/her further equipment, e.g., appliance 114, for which he/she desires remote 102 to be programmed with the relevant control codes and/or UI aspects. Server 108 has a database 120 that relates types, versions and brands of apparatus to their individual command control code sets and UI aspects. Server 108 runs a query based on the information supplied by the consumer. Upon a match between the information supplied and database 120, server 108 preferably prompts the consumer to confirm his/her entries as to the specifics of the further equipment and the specific regarding the UI desired. Upon a confirmation by the consumer, server 108 downloads to appliance 104 data representative of a control code and/or UI for being programmed into remote control device 102 via appliance 104. The downloaded data can be stored locally at STB 104 or is directly forwarded to remote 102.

Remote 102 is programmed, for example, via an IR or RF blaster 122 connected to STB 104. In this scenario, remote 102 is positioned close to blaster 122 and with an input 124 facing blaster 122. Remote 102 is equipped with circuitry (not shown) to receive and process an incoming stream of data from blaster 122. The data comprises the control codes and UI data requested from server 108. In addition, the data can contain the user-customizations including the single-key/multiple-activity feature mentioned earlier. The data also enables the circuitry to identify which button or input on remote 102 is to be associated with the code for operational use. For example, the data comprises identifying labels per code so as to enable the circuitry to identify each specific code, and to store it at remote 102 as assigned to the appropriate button or input. A proprietary communication protocol may be used that is tailored to the configuration of remote 102.

As variations on the theme above, appliance 104 is marketed in various versions that differ from each other in software controlled functionalities, or appliance 104 can be upgraded through software. For example, appliance 104 allows the user to connect to certain web sites with conditional access upon a subscription or only if the user has supplied to server 108 detailed information about his/her CE equipment. Access to special on-line sales services or on-line information brokers fall within such categories. Access to a personal information repository on server 108, e.g., for emails or recorded TV programs, also falls within such category. Enhancing the functionality of appliance 104, e.g., by providing access to these sites, is governed by appliance 104 in response to receiving specific IR or RF code from remote 102, possibly in combination with the unique ID number of appliance 104. This specific IR or RF code can again be programmed into remote 102 upon being downloaded from server 108 in the manner described above.

As explained above, this interaction model enables to create a customer base 126 based on accurate information obtained from the consumers. This information can be used to provide targeted or customized advertisements or services via STB 104, but also to obtain valuable demographic information. Note that remote 102 is preferably re-programmable so as to be upgradeable when the consumer replaces pieces of his/her equipment or obtains a new apparatus.

Call Centers, not only from the Network Operator, but also from manufacturers or other suppliers from CE equipment for use on home networks, can be given access to the user profiles of this customer base 126 so as to be able to supply more accurate help in case the consumer encounters a problem with the equipment.

Figure 2:
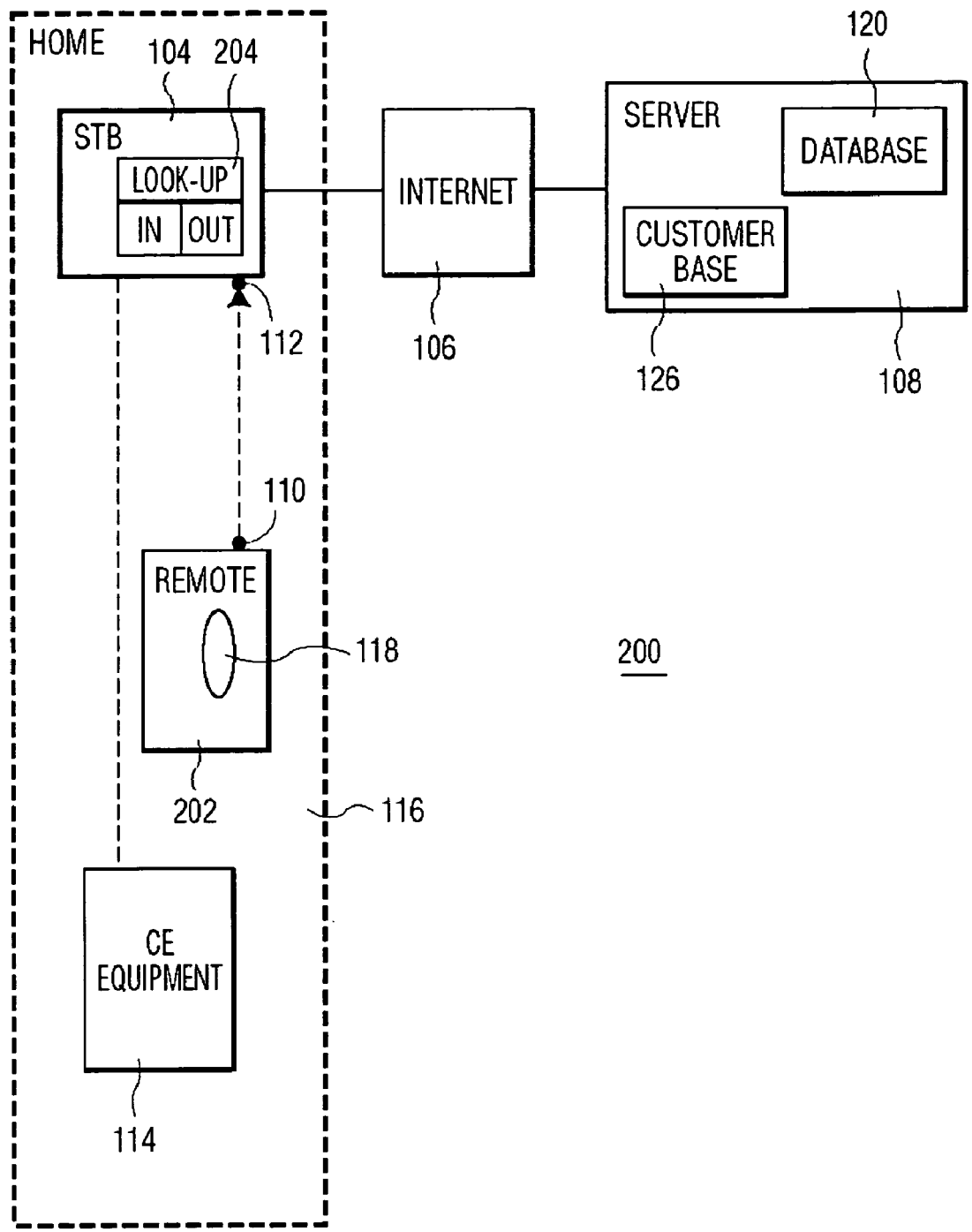

FIG. 2 illustrates an alternative system 200 according to the invention. System 200 comprises in this example a remote control device 202 that is a pre-programmed. That is, remote 202 uses a fixed protocol to communicate with STB 104 for control of apparatus 114 via STB 104. STB 104 uses a wired or wireless link with apparatus 114. In order to use this configuration with any kind of controllable apparatus 114, the user connects STB 104 to server 108 on the Internet 106 in response to the user activating a dedicated hard button 118 (or softkey 118 if remote 202 has an LCD touch screen functionality such as the PRONTO™) on remote 202. The user then specifies to server 108 what apparatus 114 he/she would like to control via remote 202, as in the example mentioned in the description of FIG. 1. Server 108 then downloads to STB 104 data representative of a control code for control of apparatus 114, the control being established via STB 102 in operational use. The data gets programmed into a look-up table 204 that associates an input received from remote 202 with an output as programmed. The output is now the data for the control command required for control of apparatus 114 via STB 104.

Within the above description, the Internet is used as an example of a data network. It is clear that a data network other than the Internet can be used as well.

Incorporated herein by reference are the following patent documents:

U.S. Ser. No. 09/519,546 filed Mar. 6, 2000 for Erik Ekkel et al., for PERSONALIZING CE EQUIPMENT CONFIGURATION AT SERVER VIA WEB-ENABLED DEVICE. This document relates to facilitating the configuring of CE equipment by the end user by means of delegating the configuring to an application server on the Internet. The consumer enters his/her preferences in a specific interactive Web page through a suitable user-interface of an Internet-enabled device, such as a PC or set-top box or digital cellphone. The application server generates the control data based on the preferences entered and downloads the control data to the CE equipment itself or to the Internet-enabled device;

U.S. Ser. No. 09/521,051 filed Mar. 8, 2000 for Geert Bruynsteen for BUSINESS MODEL FOR LEASING STORAGE SPACE ON A DIGITAL RECORDER. This document relates to adjusting via a data network the available amount of storage space of a fixed HDD (Hard Disk Drive) on a CE appliance. The consumer can upgrade the appliance via a third party service that remotely control's the HDD's settings.

U.S. Ser. No. 09/283,545 filed Apr. 1, 1999 for Eugene Shteyn for TIME- AND LOCATION-DRIVEN PERSONALIZED TV. This document relates to a server system that enables a subscriber to select a specific broadcast program for recording and a specific location and time frame for play-out of the recorded program.

U.S. Ser. No. 09/349,676 filed Jul. 8, 1999 for Kristin Ondeck for AFTER-SALES CUSTOMIZATION SPECIFIED BY RETAILER ACTS AS INCENTIVE. This document relates to a machine-implemented method of doing business that enables to stimulate commercial activities. According to the method a customer is enabled to notify a specific party, e.g., a manufacturer, importer, or distributor, or a specialized service provider, of a specific commercial activity wherein he or she is or was involved. Upon being notified, the party enables customizing, via a data network such as the Internet, the equipment of the customer as associated with the commercial activity. For example, the specific activity relates to sales of merchandise via a retailer, and the customer notifies the specific party of the purchase of the merchandise from the retailer. When the party has been notified, it enables customizing Internet-enabled or upgradeable electronic equipment of the customer, via the Internet, as associated with the specific retailer from whom the merchandise was purchased. For example, the merchandise is related to the Internet (software application or hardware device) and the customer has purchased it to make it part of his/her Internet-enabled equipment. The merchandise is enabled to be customized via the Internet, preferably according to specifications from the retailer, and also according to input as to, e.g., the intended usage, supplied by the customer at the time when the specific party was notified.

U.S. Ser. No. 09/271,200 filed Mar. 17, 1999 for Jan van Ee for FULLY FUNCTIONAL REMOTE CONTROL EDITOR AND EMULATOR. This document relates to a universal programmable remote control device with programmability functions that enable the end-user to customize the device through editing or programming the device's control functionalities. The programming can be achieved via a PC. The control configuration created via an editor on the PC can be downloaded into the device. The PC has emulator software to test the configuration before downloading. The emulator software and the remote's control software are made identical as a consequence of a software layer that abstracts from the remote's hardware. The emulator for the end-user is thus obtained as an almost free byproduct of the software development phase at the manufacturer.

U.S. Pat. No. 5,819,294 issued to Paul Chambers for AUTOMATIC CONFIGURATION MECHANISM FOR UNIVERSAL REMOTE. This patent relates to a programmable remote controller that is programmed via, e.g., a PC. In this example, the PC has an onboard data base for sets of codes used by a variety of commercially available remote controllers. The data base contains sets of compressed codes. In order to program the remote, the user lets the PC find a match between a single pulse-code transmitted by a specific known controller on the one hand and an item in the data base on the other hand. Upon finding the match, the set containing the matching item is stored in the programmable controller as corresponding to the particular apparatus that is controllable via the specific remote.

Note that the search algorithm of U.S. Pat. No. 5,819,291, mentioned above, can also be used with the current invention. For example, a remote of an apparatus sends a command to the STB while connected to the service's web site. The code gets converted into data and uploaded to the SmartConnect (SM) server where it gets compared, in a suitable format, with data representing commands in a data base of commands at the server in the manner specified by the Chambers' patent.

U.S. Ser. No. 09/217,414 filed Dec. 21, 1998 for Yevgeniy Shteyn and Jan van Ee for CLUSTERING OF TASK-ASSOCIATED OBJECTS FOR EFFECTING TASKS AMONG A SYSTEM AND ITS ENVIRONMENTAL DEVICES. This document relates to a graphical user-interface (GUI) wherein semantically similar actions are clustered under a single user-input. This document discusses tasking systems and methods that support user interfaces for displaying objects. The displayed objects enable user access to resources that provide for effecting tasks among the system and devices of the systems' environment. More particularly, tasking systems and methods are provided that support the foregoing features, wherein the systems and methods support clustering operations respecting such task-associated objects so as to enhance the effecting of the associated tasks, such clustering operations responding to context. The clustering operations preferably are both adaptive and dynamic. Tasking systems and methods preferably support the tracking of selected states, including, as examples, one or more of environment states, device states, and system states. Tracked states typically also include states respecting other relevant criteria, such as temporal criteria.

U.S. Ser. No. 09/311,128, corresponding to published International Application WO0017738, filed May 13, 1999 for Joost Kemink for INTERNET-BASED SERVICE FOR UPDATING A PROGRAMMABLE CONTROL DEVICE. This document relates to an Internet based service for updating a programmable control device. An Internet site contains links to appliance-dependent control and feature option information which can be downloaded to the programmable control as a graphic user interface (GUI). A user interface is provided at the site for the user to easily specify a target appliance, and thereafter selectively download the interface and control information that is available for the target appliance. The Internet site also contains links to other providers of configurations and macros, such as system integrators who provide interfaces based on an inventory of the user's controllable equipment, hobbyist who share configurations and macros that they have found useful.

What is claimed is:

1. A system for automatically programming a remote control to control multiple consumer electronic (CE) devices, comprising:
   a client-side set-top box (STB) that connects to the Internet;
   a server-side dedicated server that connects to the Internet and communicates thereby with the STB;
   a remote control in wireless communication with the STB and having a dedicated programming button that, when depressed, initiates a connection over the internet, via the STB, with the dedicated server; and
   a user interface on which remote control programming instructions are presented to a user of the remote control;
   wherein the user enters information related to identified CE devices that the user wishes to control via the remote, the information is transmitted wirelessly to the STB, which transmits the information to the dedicated server via the Internet;
   wherein STB receives control codes via the Internet for the identified CE devices and transmits the control codes wirelessly to the remote control;
   wherein the remote control programs itself to control the identified CE devices using the control codes; and
   wherein the remote control is pre-programmed to communicate with the STB.

2. The system according to claim 1, wherein the dedicated server transmits menu information to the STB, which is presented to the user via the user interface, and which includes configuration options that can be selected by the user.

3. The system according to claim 2, wherein the dedicated server transmits a graphical display of the remote control to the STB, which presents the Graphical display to the user via the user interface.

4. The system according to claim 3, wherein the user associates multiple control codes with a single button on the graphical representation of the remote control.

5. The system according to claim 4, wherein the user performs control code-to-button associations prior to transmission of the control codes to the remote control.

6. The system according to claim 5, wherein the remote control programs itself to cause at least one function to be performed at each of a plurality of CE devices when the button is depressed, the plurality of CE devices corresponding to the respective control codes associated with the button.

7. The system according to claim 5, wherein the dedicated server provides suggestions related to remote control configuration as a function of menu selections made by the user.

8. The system according to claim 7, wherein the server suggests the specific button by highlighting the button on the graphical representation of the remote control presented on the user interface, via the STB.

9. The system according to claim 8, wherein the remote control programs itself, upon user acceptance of the suggested button, to cause execution of the multiple activities at respective CE devices when the button is depressed, the plurality of CE devices corresponding to the respective control codes associated with the button.

10. The system according to claim 3, wherein the dedicated server provides suggestions related to remote control configuration as a function of menu selections made by the user.

11. The system according to claim 10, wherein the dedicated server suggests a specific button assignment for multiple control codes in response to user selection of a menu option indicating that the user desire a single action at the remote control to cause the execution of multiple activities at multiple CE devices.

12. The system according to claim 11, wherein the dedicated server suggests the specific button by highlighting the button on the graphical representation of the remote control presented on the user interface, via the STB.

13. The system according to claim 12, wherein the remote control programs itself, upon user acceptance of the suggested button, to cause execution of the multiple activities at respective CE devices when the button is depressed, the plurality of CE devices corresponding to the respective control codes associated with the button.

14. The system according to claim 13, wherein the dedicated server suggests a specific button assignment for multiple control codes in response to user selection of a menu option indicating that the user desire a single action at the remote control to cause the execution of multiple activities at multiple CE devices.

15. The system according to claim 1, wherein the dedicated server generates and stores a user profile based on information entered by the user through the remote control.

16. A method of programming a user's remote control device for use with a plurality of consumer electronics (CE) devices, comprising:
   connecting an Internet-connectable CE device to a dedicated server via the Internet in response to the user activating the remote control device;
   requesting, by the dedicated server via the Internet-connectable CE device, alphanumeric information from the user corresponding to the user's CE devices, wherein the dedicated server request is made to the Internet-connectable CE device responsive to activation of the remote control device;
   supplying, from the user to the dedicated server, via the Internet-connectable CE device, the requested alphanumeric information, corresponding to the user's CE devices;
   performing a query at the dedicated server based on the alphanumeric information supplied by the user, to match the alphanumeric information supplied by the user to alphanumeric information stored in a data repository, wherein the data repository relates types, versions and brands of CE devices to their respective control codes;
   providing a menu to the user for customizing the programming of the remote control device;
   downloading, from the dedicated server to the Internet-connectable CE device, data representative of at least one control code, wherein the data matches the alphanumeric information supplied by the user for use with at least one of the user's CE devices;
   downloading, from the dedicated server to the Internet-connectable CE device, user interface data regarding the remote control device and using the network connectable CE device for the programming of the remote control device according to the user interface data;

transmitting a wireless signal including the data representative of at least one control code from the Internet-connectable CE device to the remote control device for the programming thereof;

providing a display with a graphical representation of the remote control device for use in the programming of the remote control device; and programming the user's remote control device according to the downloaded data representative of at least one control code, via the Internet-connectable CE device;

wherein the menu allows the user to specify whether certain operations provided by the downloaded data are desired, and allows the user to program a single action on the remote control device to cause the execution of multiple activities on the user's CE devices; and wherein the user interface data provides information regarding features that support user interaction with the remote control device.

17. The method according to claim 16, further including providing from the dedicated server a suggestion related to assigning a button on the remote control device to cause the execution of the multiple activities on the user's CE devices.

18. The method according to claim 17, wherein the dedicated server suggests the button assignment by highlighting a button on the graphical representation of the remote control device on the display.

19. The method according to claim 16, further including generating a user profile from user selections from the menu, and employing the user profile during a customer service event.

20. A method for automatically programming a remote control to control multiple consumer electronic (CE) devices, comprising:

establishing an Internet connection between a client-side set-top box (STB) and a server-side dedicated server;

establishing a wireless connection between a remote control and the STB;

providing a user interface on which remote control programming instructions are presented to a user of the remote control;

prompting the user to enter information, via the remote control, related to CE devices that the user identifies a desire to control via the remote;

wirelessly transmitting the entered information to the STB;

transmitting the entered information from the STB to the dedicated server via the Internet;

querying the dedicated server to identify control codes for the identified CE devices;

receiving control codes at the STB via the Internet for the identified CE devices;

suggesting assignment of multiple control codes to a single button on the remote control;

prompting the user to accept the suggested assignment or to indicate a different assignment of multiple control codes to a single button on the remote control;

wirelessly transmitting the control codes to the remote control; and programming the remote control associate the assigned control codes with the single button;

wherein suggesting assignment of multiple control codes to the single button comprises highlighting the single button on a graphical representation of the remote control on a user interface coupled to the STB; and wherein the remote control is pre-programmed to communicate with the STB.

* * * * *